US006502912B1

(12) United States Patent
Bernard et al.

(10) Patent No.: US 6,502,912 B1
(45) Date of Patent: Jan. 7, 2003

(54) METHOD OF PRINTING POSTAGE INDICIA USING INK JET TECHNOLOGY

(75) Inventors: Richard A. Bernard, Norwalk, CT (US); Jerome E. Jackson, Newtown, CT (US); Charles F. Murphy, III, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 974 days.

(21) Appl. No.: 08/710,796

(22) Filed: Sep. 23, 1996

(51) Int. Cl.[7] .............................. B41J 3/00; G01D 11/00
(52) U.S. Cl. ............................ 347/2; 235/491; 347/100
(58) Field of Search ................................ 347/107, 4, 2, 347/5, 100; 235/491, 494, 487

(56) References Cited

U.S. PATENT DOCUMENTS

| | | | | | |
|---|---|---|---|---|---|
| 3,869,986 | A | * | 3/1975 | Hubbard | 347/4 X |
| 3,913,719 | A | * | 10/1975 | Frey | 347/4 X |
| 4,404,566 | A | | 9/1983 | Clark et al. | |
| 4,608,575 | A | | 8/1986 | Morgan | |
| 4,910,528 | A | | 3/1990 | Firl et al. | |
| 4,953,995 | A | | 9/1990 | Sims et al. | |
| 4,963,882 | A | | 10/1990 | Hickman | |
| 5,373,350 | A | * | 12/1994 | Taylor | 347/3 X |
| 5,423,617 | A | | 6/1995 | Marsh et al. | |
| 5,525,798 | A | * | 6/1996 | Berson | 235/491 X |
| 5,554,842 | A | * | 9/1996 | Connell | 235/491 |
| 5,674,314 | A | * | 10/1997 | Auslander | 347/100 X |

* cited by examiner

*Primary Examiner*—Craig Hallacher
(74) *Attorney, Agent, or Firm*—Alberta A. Vitale; Angelo N. Chaclas; Charles R. Malandra

(57) ABSTRACT

A method of printing a composite image composed of a postage indicia image and an adjacent nondescript image on an image receiving medium is disclosed. The postage indicia image contains alpha-numeric data which must be machine readable and therefore must be printed with a high quality water fast ink, and is printed with a printing device utilizing ink jet technology. The nondescript image is merely a flag image containing fluorescent material and does not contain alpha-numeric data that must be machine readable, and therefore can be printed by any other suitable printer using commercially available fluorescent ink.

3 Claims, 1 Drawing Sheet

FIG. 1
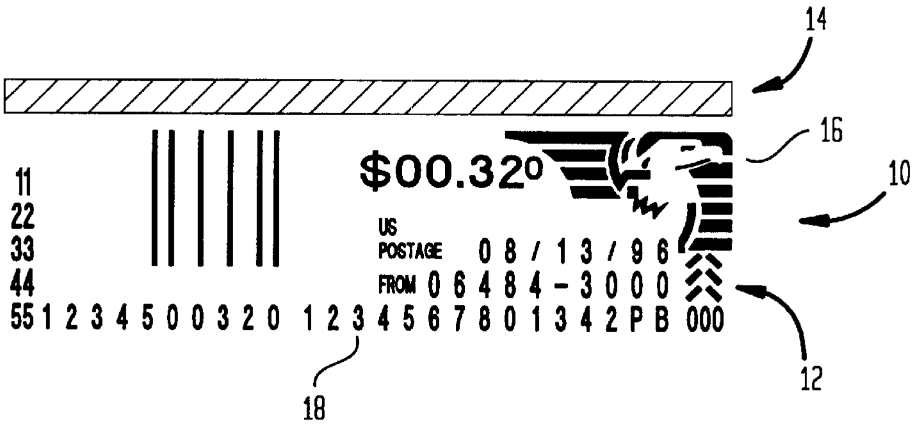
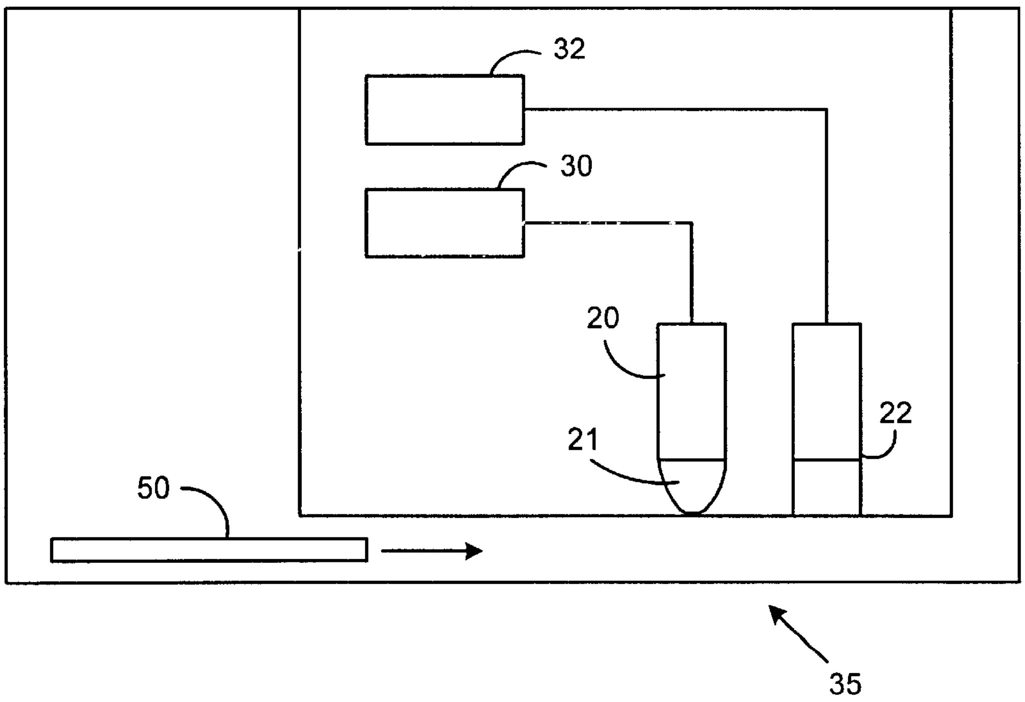
FIG. 2

METHOD OF PRINTING POSTAGE INDICIA USING INK JET TECHNOLOGY

RELATED APPLICATION

This application discloses and claims an invention that is a modification of the invention disclosed and claimed in copending (E-524) U.S Pat. No. 5,912,624 application Ser. No. 08/717,284, filed on Sep. 23, 1996, concurrently with this U.S. Pat. No. 5,912,624 application, and assigned to the assignee of this application.

BACKGROUND OF THE INVENTION

This invention relates generally to the field of printing utilizing ink jet technology, and more particularly to a method of utilizing a combination of ink jet technology and another printing technology that is not ink jet to print a composite image of a postage indicia image and another image with inks having distinct and unique characteristics.

Various details of the background of this invention are set forth in the Background of the Invention section of the aforementioned copending application, which section is hereby incorporated by reference and made a part of this application.

Briefly, the invention disclosed and claimed in that application is a method of printing a postage indicia image on an image receiving medium utilizing ink jet printing technology, the image being composed of discrete portions each of which is printed with an ink having a distinct and unique characteristic. The method comprises the steps of providing a pair of ink jet print heads, each print head having a linear array of ink jet nozzles, a reservoir for holding a supply of ink, and actuating means interposed between the array of nozzles and the reservoir for ejecting ink from the nozzles onto the image receiving medium in a predetermined image pattern. Ink is provided in each of the reservoirs having a different unique characteristic, and then causing relative movement between the image receiving medium and the print heads. Finally, each of the actuating means is activated simultaneously during a single pass of the relative movement between the image receiving medium and the print heads so that ink from each of the print heads is deposited on the image receiving medium during the single pass in a predetermined sequence of operation for each print head, with the result that one portion of the image is printed with ink having a certain unique characteristic and simultaneously another portion of the image is printed with ink having a different unique characteristic.

In the postage indicia image printed by that method, one of the discrete portions is composed of alpha-numeric data which must be machine readable, and therefor must be printed with a clean, high quality ink that has a high degree of water fastness so that it will not smear if it is somehow exposed to excessive moisture. The other discrete portion is composed of graphic material which need not be machine readable and therefore need not be printed with water fast ink, but which must contain a fluorescent material that can be detected by a suitable fluorescent material detecting device so that the orientation of an envelope passing through a facing machine, as explained in the aforementioned Background of the Invention section of the copending application, can be detected and recognized as proper or improper so that it can be passed on or reoriented, as the case may be.

One disadvantage of this printing method is that the actual embodiment required to carry out the invention required at least two entire ink jet printing devices, one for each of the discrete portions, and each with its own one or two linear arrays of nozzles, depending on the height of the individual discrete portions, its own ink reservoirs and its own actuating means for ejecting minute droplets of ink from the nozzles onto the image receiving medium. In other words, in order to print both the graphic portion of the postage indicia of that application with the ink having the distinct characteristics required for each of the indicia portions, a complete duplication of the ink jet printing devices is required.

Another disadvantage is that each ink jet printing device requires a unique form of ink, in that the conventional ink used in current postage meter indicia printing devices does not work in printers using ink jet technology, thereby requiring custom made inks adapted from similar inks developed for other purposes. Thus, for the alpha-numeric portion of the indicia, an ink is required that is water based for many ink jet printing devices, such as bubble jet. Also it must be sufficiently water fast to meet the standards of the Postal Service for water fastness, and typically water based inks are not as water fast as solvent based inks, but the latter cannot be used in bubble jet printing devices because they are not compatible. For the graphic portion of the indicia, an ink is required that has a fluorescent material therein, but it must still be water based, although it need not be water fast. Typically, the inks used in conventional postage meters are oil based and are both water fast and have fluorescent material therein.

Thus, the complete duplication of all of the components and individual parts of the ink jet print heads involves a degree of complexity, cost and maintenance which tends to offset the savings in complexity and cost of the ink jet printing device over conventional postage meter indicia printing devices.

BRIEF SUMMARY OF THE INVENTION

The present invention at least obviates if not entirely eliminates the disadvantages and drawbacks of the invention disclosed and claimed in the aforementioned copending application. This application discloses and claims an invention that avoids the complete duplication of ink jet print heads described above, and instead utilizes ink jet technology to print an entire postage indicia consisting of both machine readable alpha-numeric data, and a non-machine readable graphic element which makes up part of the postage indicia, and utilizes conventional, non-ink jet technology for a suitable device to print a mere non-distinct graphic image with any conventional fluorescent, non-water fast ink, solely for the purpose of having a fluorescence recognizable portion of any convenient design adjacent to the postage indicia.

Thus, in its broader aspects, the present invention is a method of printing a composite image composed of a postage indicia image and an adjacent nondescript image on an image receiving medium utilizing a combination of ink jet printing technology for the postage indicia image and a printing technology other than ink jet for the nondescript image, the postage indicia image and the nondescript image being printed by separate printing devices having different inks, each having a distinct and unique characteristic. In this environment, the method of the invention comprises the steps of providing a pair of printing devices, one of which incorporates ink jet technology and includes an ink jet print head having an array of ink jet nozzles, a reservoir for holding a supply of ink, and actuating means interposed between the array of nozzles and the reservoir for ejecting ink from the nozzles in a predetermined image pattern, the other of which printing devices incorporates a non-ink jet printing technology. Ink is provided to each of the printing devices having a different unique characteristic, and then causing relative movement between the image receiving medium and the ink jet printing device and the other printing device. Finally, the actuating means of the ink jet print head and the other printing device are actuated simultaneously during a single pass of the relative movement between the image receiving medium and the print head of the ink jet printing device and the other printing device, so that ink from the ink jet printing device and from the other printing device is deposited on the image receiving medium during the single pass in a predetermined sequence of operation for the ink jet print head and the other printing device, with the result that the postage indicia image is printed with ink having a certain unique characteristic and simultaneously the nondescript image is printed with ink having a different unique characteristic.

In some of its more limited aspects, the linear array of nozzles of the ink jet print head and the other printing device are arranged in side by side relationship so that the other printing device prints the nondescript image immediately adjacent to the postage indicia image. The step of causing the relative movement includes the step of maintaining the printing devices stationary and causing the image receiving medium to move past the printing devices.

Having briefly described the general nature of the present invention, it is a principal object thereof to provide a method of printing a composite image composed of a postage indicia image and an adjacent nondescript image on an image receiving medium utilizing a combination of ink jet printing technology for the postage indicia image and a printing technology other than ink jet for the nondescript image.

It is another object of the present invention to provide a method of printing a combination image composed of a postage indicia image and an adjacent nondescript image on an image receiving medium in which both portions of the composite image are printed with inks having unique characteristics, the ink for the postage indicia image being water fast and the ink for the nondescript image being fluorescent and somewhat water fast.

These and other advantages and features of the present invention will become more apparent from an understanding of the following detailed description of a presently preferred embodiment of the present invention, when considered in conjunction with the accompanying drawing.

DESCRIPTION OF THE DRAWING

FIG. 1 is a typical example of a composite image that is printed by the method of the present invention, showing a representative postage meter indicia and an adjacent nondescript image.

FIG. 2 is an illustration of an exemplary mechanism for printing postage by the method of the present invention.

DETAILED DESCRIPTION OF THE INVENTION

With reference now to FIG. 1, there is seen a composite image indicated generally by the reference numeral 10, which is composed of a data component and indicated generally by the reference numeral 12, and a nondescript component indicated generally by the reference numeral 14. The data component may contain a graphic image 16, such as the fanciful representation of an eagle, and various items of alpha-numeric data 18. The nondescript component 14 contains no data at all, and is merely any form of geometric design, such as the stripe shown on the drawing, which if preferred could be replace with a series of stripes, dots, triangles, etc., or a short rectangle, circle, triangle, or any other configuration that may be desired and that will fit within the space designated for the composite image 10 on an envelope.

As discussed both above and in the aforementioned copending application, it is necessary to print the alpha-numeric data 18 with a water fast ink since this data must be machine readable in the sorting machines described in the copending application, and, therefore, cannot be subject to smearing from contact with excessive moisture. Thus, this component of the composite image 10 is most desirably printed with a printing device utilizing ink jet technology, preferably a bubble jet printing device since it is the type most suitable to printing postage indicia images, and a reasonably water fast ink which will meet the Postal Service standards for water fast ink is commercially available.

The nondescript image 14 is provided merely for the purpose of having a fluorescent flag on the envelope in the area where the fluorescent material detector of a facing machine would look for fluorescent material. Since there is no data in this image that must be machine readable, it need not be printed with highly water fast ink in a complicated electronically addressable device, but it must be printed with fluorescent ink, albeit one which may not be particularly water fast, so that it functions to indicate to a facing machine whether or not the envelope is properly oriented, either to be passed through a canceling machine for cancellation of the postage indicia if desired, or to be passed along to a high speed sorting machine. Since this component is not printed with a bubble jet or other form of ink jet printing device, the ink for the printing device that prints this component need not be as pure or as clean as the ink for the ink jet printing device; in fact commercially available postage mater ink can be utilized. Of course, any ink used to print the nondescript component 14 must be sufficiently water fast that it does not lose its fluorescent characteristic in the presence of moisture, but it need not be as water fast as that which is required for printing data which must be machine readable.

The nondescript image can be printed by any of a variety of commercially available printers, such as a dot printer, roller printer, brush printer, etc., the only requirement being that it is compatible with fluorescent inks.

Thus, the present invention is the method of printing the composite image 10 as shown in the figure, utilizing the combination of ink jet printing technology to print the alpha-numeric component 12, and a printing technology other than ink jet to print the nondescript component 14, each being printed with an ink that has a distinct and unique characteristic applicable to the function of each of the components. An exemplary printing apparatus 35 is illustrated in FIG. 2. The first step is to provide a pair of printing devices, 20 and 22, one of which incorporates ink jet technology 20 and includes an ink jet print head having a linear array of ink jet nozzles, a reservoir for holding a supply of ink, and actuating means 30 interposed between the array of nozzles and the reservoir for ejecting ink from the nozzles 21 in a predetermined image pattern, and the other of which incorporates a non-ink jet printing technology. From a packaging standpoint, the ink jet print head and the other printing device could easily be disposed in separate cartridges or other form of unitary assemblies which can be inserted in the overall printing apparatus, although in the interest of economy of space, it would be preferable to place both printing devices in the same unitary assembly in a manner which would facilitate maintenance and service of either printing device.

The next step is that ink is provided in each of the printing devices that has the distinct unique characteristics, i.e., one is more easily formulated to be water fast and non-fluorescent, and the other is close to a standard ink known in the art. Any suitable mechanism 35 is provided for causing relative movement between the image receiving medium, typically an envelope, and the printing device, although in general practice, the envelopes are moved through the mailing machine and the printing element remains stationary. It is also standard practice to print postage indicia on labels which are then applied to envelopes 50 which are thick or irregular in shape and therefore cannot be fed through a mailing machine.

The next step is to activate the actuating means 20 and 22 of the ink jet printing device 20 and the other non-ink jet printing device 22 simultaneously during a single pass of an envelope 50 through the mailing machine so that ink from each of the ink jet print head and the other printing device is deposited on the envelope during the movement thereof in a predetermined sequence of operation for each printing device. This is accomplished in known manner in the ink jet printing device by utilizing a microprocessor and appropriate software in a manner that energizes the heater in each of the heating chambers, as fully described in the aforementioned copending application, in a predetermined sequence, to create the bubbles therein that eject the minute droplet of ink from the nozzles associated with the individual heating chambers. This causes the ink to be deposited on the envelope in the desired image pattern. Of course, as with the invention disclosed and claimed in the copending application, other forms of ink jet printing devices can be used, and they would be controlled in the same manner.

It will be understood that the printing from both the ink jet printing device and the other printing device is taking place simultaneously as the envelope passes under the respective printing devices, i.e., the ink jet print head that is supplied with the water fast ink is printing the alpha-numeric component 12 of the composite image 10, and simultaneously the other print head that is supplied with the fluorescent ink is printing the nondescript component 14. Even if it is necessary to slightly offset one of the printing devices from the other in the direction of movement of the envelope due to packaging considerations, the printing from both printing device is still substantially simultaneous even though the respective printing operations may not commence and terminate in synchronism.

Although reference has been made to the array of nozzles on the print head being linear, it is within the scope of the invention that nozzle arrays other than linear can be employed, such as dual arrays with staggered nozzles for greater resolution of print, arrays that are disposed at an angle to the longitudinal direction of movement of the envelope, or even curved arrays for any desirable purpose.

Thus, it will be apparent that since there is no critical data in the nondescript component 14 which must be machine readable, this component can be printed with the non-ink jet printing device using ordinary fluorescent ink, even though this ink is not very water fast. The alpha-numeric component 12, on the other hand, does contain data which must be machine readable and therefore is printed by the ink jet printing device which is supplied with the water fast ink, with both components being printed simultaneously.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method of printing a composite image composed of a postage indicia image and an adjacent nondescript image on an image receiving medium utilizing a combination of ink jet printing technology for said postage indicia image and a printing technology other than ink jet for said nondescript image, said postage indicia image and said nondescript image being printed by separate printing devices having different inks, said method comprising the steps of A. providing a pair of printing devices, one of which incorporates ink jet technology and includes an ink jet print head having an array of ink jet nozzles, a reservoir for holding a supply of ink, and actuating means interposed between said array of nozzles and said reservoir for ejecting ink from said nozzles in a predetermined image pattern, the other of which incorporates a non-ink jet printing technology, B. providing said ink jet printing device with a machine readable waterfast non-fluorescent ink that reduces smearing and providing said non-inkjet printing device with conventional fluorescent ink compatible with non-inkjet printing devices, C. causing relative movement between said image receiving medium and said ink jet printing device and said other printing device, and D. activating said actuating means of said ink jet print head and said other printing device simultaneously during a single pass of said relative movement between said image receiving medium and said print head and said other printing device, so that ink from said ink jet printing device and from said other printing device is deposited on said image receiving medium during said single pass in a predetermined sequence of operation for said print head and said other printing device, whereby said postage indicia image is printed with said machine readable waterfast non-fluorescent ink that reduces and said nondescript image is printed with said conventional fluorescent ink compatible with non-inkjet printing devices.

2. A method as set forth in claim 1 wherein said linear array of nozzles of said ink jet print head and said other printing device are arranged in side by side relationship so that said other printing device prints said nondescript image immediately adjacent said postage indicia image.

3. A method as set forth in claim 1 wherein said step of causing said relative movement includes the step of maintaining the printing devices stationary and causing said image receiving medium to move past said printing devices.

* * * * *